United States Patent [19]
Rohrer

[11] 3,863,219
[45] Jan. 28, 1975

[54] DATA PREPROCESSING SYSTEM FOR CHARACTER RECOGNITION SYSTEMS

[75] Inventor: Gene D. Rohrer, Endwell, N.Y.

[73] Assignee: International Business Machines Corporation, Armonk, N.Y.

[22] Filed: Oct. 9, 1973

[21] Appl. No.: 404,462

[52] U.S. Cl. ............ 340/146.3 C, 330/85, 330/103, 340/146.3 H

[51] Int. Cl. ............ G06k 9/00

[58] Field of Search ............ 330/85, 103, 110, 107; 333/80 R, 80 T; 340/146.3 C, 146.3 Z, 146.3 H

[56] References Cited

UNITED STATES PATENTS

| | | | |
|---|---|---|---|
| 3,215,824 | 11/1965 | Alexander et al. | 330/85 X |
| 3,408,590 | 10/1968 | Moschytz | 330/85 |
| 3,436,670 | 4/1969 | Solomon | 330/85 |
| 3,482,211 | 12/1969 | De Claris et al. | 340/146.3 C |
| 3,633,043 | 1/1972 | Anthony | 330/85 |

OTHER PUBLICATIONS

Kengla, et al., "Active Low-Pass Filter with Gain," IBM Tech. Disclosure Bulletin, Vol. 10, No. 3, August, 1967, pp. 344–345.

*Primary Examiner*—Gareth D. Shaw
*Assistant Examiner*—Leo H. Boudreau
*Attorney, Agent, or Firm*—Paul M. Brannen

[57] ABSTRACT

Improved operation of character recognition systems for reading magnetized ink characters is obtained by utilizing a Kalman-type prediction filter following the output of the amplifiers used for amplifying the signals obtained by scanning the characters with a magnetic read head.

10 Claims, 6 Drawing Figures

DATA PREPROCESSING SYSTEM FOR CHARACTER RECOGNITION SYSTEMS

FIELD OF THE INVENTION

This invention relates generally to data preprocessing systems for character recognition systems and particularly to an improved data preprocessing system for systems employed to read magnetized ink characters.

DESCRIPTION OF THE PRIOR ART

In known character recognition systems for reading magnetized ink characters, the conversion of the character flux contours to electronic signals is distorted due to the transfer functions of the transducers and preamplifiers. Since the parameters that introduce the distortion cannot be eliminated, previous recognition systems contain error in the measurement of flux contours.

SUMMARY OF THE INVENTION

It is a principal object of the present invention to provide an improved data preprocessing system for character recognition systems for eliminating inherent distortion.

A more particular object of the invention is to provide a system of the type described utilizing a Kalman-type prediction filter to counteract distortion in the system.

Other objects of the invention and features of novelty and advantages thereof will become apparent from the detailed description to follow taken in connection with the accompanying drawings.

In practicing the invention, a Kalman-type prediction filter is inserted in the character recognition system input channel or channels, following the transducer and the preamplifiers. The filter is designed and arranged so that it compensates for the inherent distortion in the preceding portion of the whole system.

The filter, in the best mode contemplated, comprises a first operating amplifier having one terminal of two input terminals connected to the filter input and having its output terminal connected to the filter output. A passive impedance feedback network is provided from the output of the first amplifier to the first input terminal thereof. An active feedback network is also provided from the output of the first amplifier to the second input terminal thereof. This network comprises a second operating amplifier having a first one of two input terminals connected to the output of the first amplifier via a first series impedance network, the second input terminal being grounded. A passive impedance feedback network is provided from the output of the second amplifier to the first input terminal thereof. The output of the second amplifier is coupled to the second input of the first amplifier via a second series impedance network.

GENERAL DESCRIPTION OF THE DRAWINGS

In the drawings

Similar reference characters refer to similar parts in each of the several views.

DETAILED DESCRIPTION OF THE PREFERRED EMBODIMENT

Figure 1A:
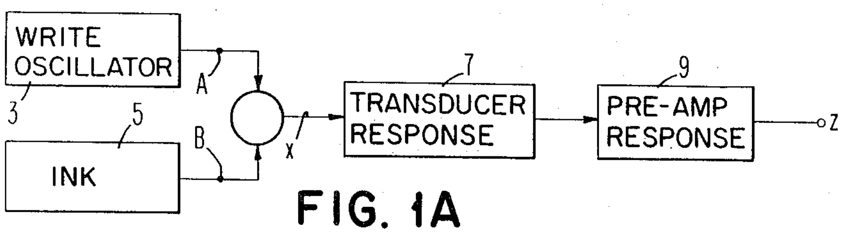
FIG. 1A is a diagrammatic illustration of a portion of a conventional magnetic ink character recognition system, considered from an analytical model basis.

Referring now to FIG. 1A of the drawings, there is shown in schematic form a model of a single information channel in a magnetic ink character recognition system which uses an alternating current for magnetizing the characters in advance of reading. This model provides an analytical means for characterizing such a channel, and also enables the provision of expressions necessary to apply advanced methods of design for generating the reading system. A write oscillator 3 which comprises a source of alternating current of suitable frequency and amplitude supplies a signal to an input point designated by the reference character A. The other input at this point in the system constitutes the magnetizable ink forming a portion of the character which is considered as an input at point B. The inputs are combined providing a resultant output X which constitutes the flux emitted from a magnetized character as a result of magnetization of the ink by the write osicllator 3. A suitable magnetic reading head 7 is provided for detecting the flux, and has a particular response characteristic. The output of this transducer is supplied to a preamplifier 9 having a particular response characteristic also. At the output of the preamplifier there will be provided a signal Z which can be considered as an output of the system comprising the elements 7 and 9.

Figure 1B:
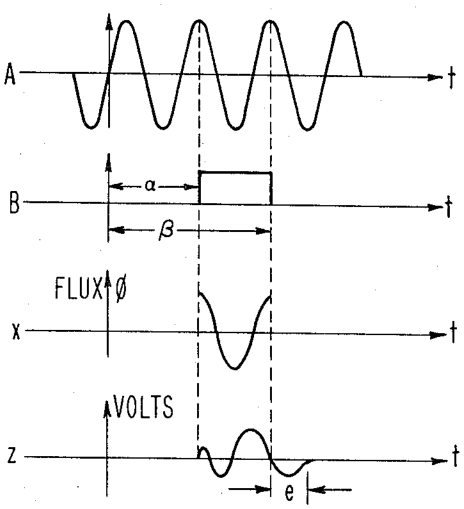
FIG. 1B is a diagrammatic illustration of various waveforms encountered in the system of FIG. 1A.

FIG. 1B shows the relationships between the various input and output signals as they vary with respect to time $t$. Several cycles of oscillation of the write oscillator are shown, as well as a portion of ink comprising a part of a character, the alpha and beta times being inputs to the system and representing the time at which the ink portion begins and ends at the read head. It can be seen then that the magnetized character will therefore have the resultant flux pattern as shown by the third waveform from the top. When this flux pattern is detected by the transducer 7 and supplied via amplifier 9 to the output Z, the resultant voltage wave is as shown in the fourth diagram, and as indicated therein, an error $e$ is developed in measuring the duration of the ink interval.

Figure 2B:
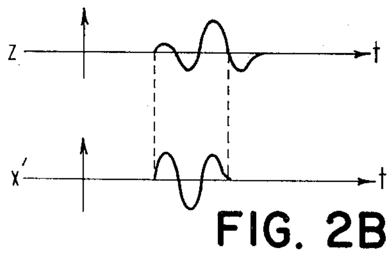
FIG. 2B is a diagrammatic illustration of waveforms at the input and output of the system of FIG. 2A.
Figure 2A:
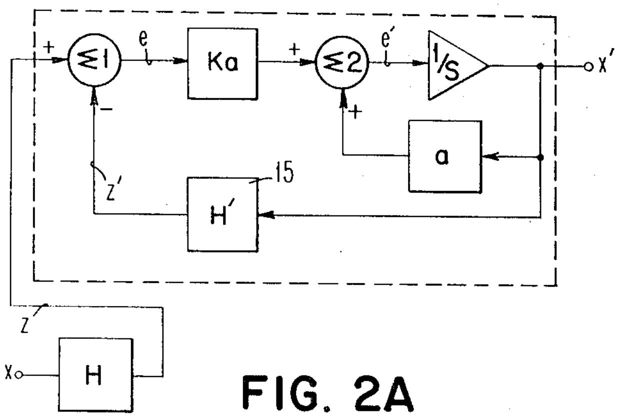
FIG. 2A is a block diagram of a Kalman-type filter in accordance with the present invention.

Referring now to FIG. 2A of the drawings, there is shown a schematic functional diagram of a Kalman filter prediction system which is connected to the output of the arrangement shown in FIG. 1A to provide a means for characterizing and eliminating the input system error.

The output Z of the system shown in FIG. 1A is subtracted from an approximation of the output Z', which is then passed through an integrator which defines the response of the flux on the document. The element 15 constitutes an approximation H of the front-end transfer function. The output of the Kalman filter, designated as X', is the prediction of the flux contour designated as X in FIG. 1A, presented to the read head and without system error.

FIG. 2B shows the relationship between the input Z to the arrangement shown in FIG. 2A and the output therefrom designated X'. It will be noted that this output has the error $e$, as shown in FIG. 1B, eliminated therefrom.

Figure 3:
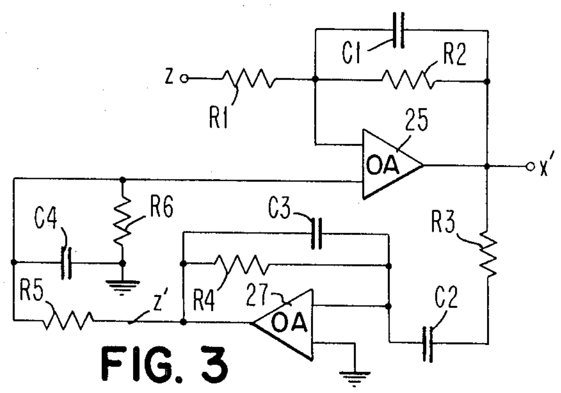
FIG. 3 is a diagrammatic illustration of a circuit arranged in accordance with a preferred embodiment of the invention.

A circuit diagram of a preferred form of filter useful for this purpose is shown in FIG. 3. The output Z of the preamplifer is supplied via an input resistor R1 to one input of an operational amplifer 25. The output of the amplifer 25 is returned to the input via a passive feedback circuit comprising capacitor C1 and resistor R2. The output of amplifier 25 is also connected to the terminal X', and also fed back to the second input amplifier 25 via an active feedback network, which includes a resistor R3 and a capacitor C2 connected to the one input of an operational amplifier 27. The output of amplifier 27 is fed back to the input via a circuit including capacitor C3 and resistor R4, connected in parallel. The other input of amplifier 27 is connected to ground. The output of operational amplifier 27, designated as Z', is supplied to the second input of operational amplifier 25 via a series of impedance circuit including the resistor R5, and resistor R6 and capacitor C4 connected in multiple between the input to amplifier 25 and ground.

Figure 4:
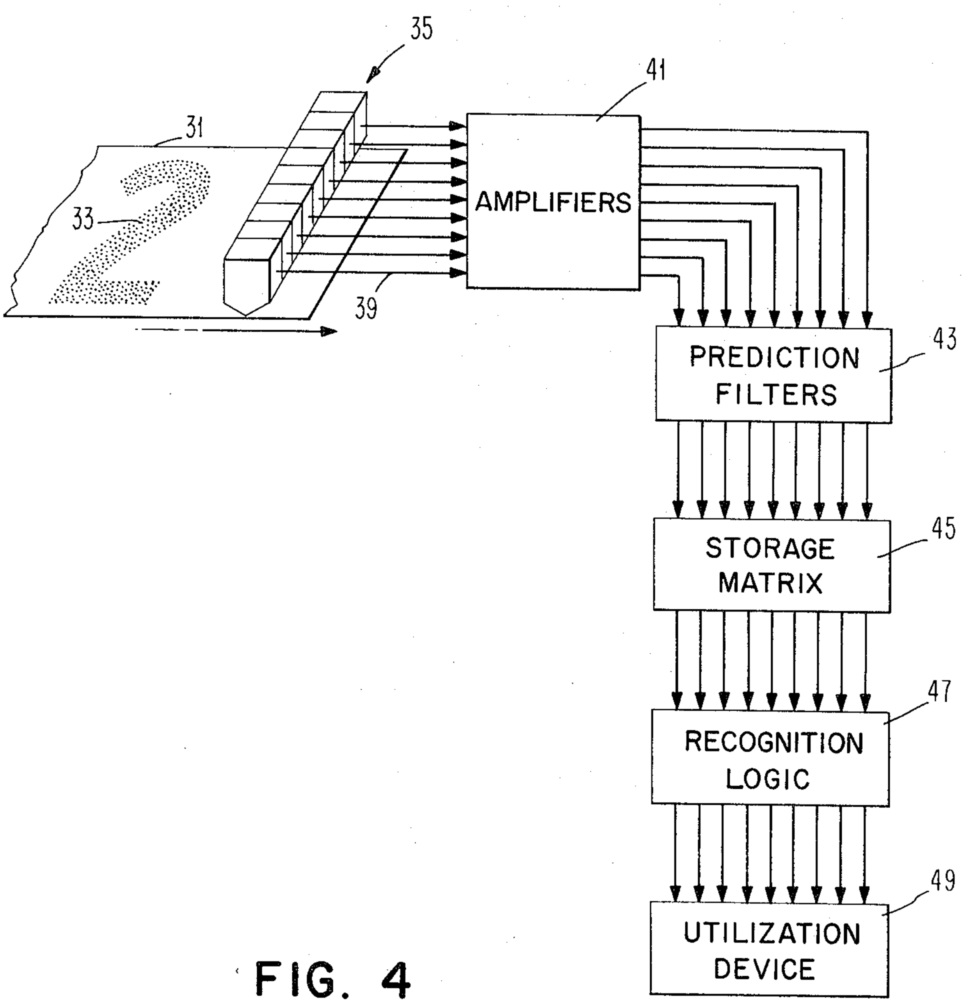
FIG. 4 is a diagrammatic illustration of a multigap magnetic ink character recognition system using the present invention.

The relationship of the various elements of the filter system shown in FIG. 4 may be derived by considering the mathematical relationships of the elements shown in FIG. 2A.

The expression for X' can be written by first describing $e'$, $$e' = Kae + aX' \quad (1)$$

then $$X' = 1/S\ e' = (a/S)(Ke + X')$$
$$X' = (aK/S—a)e \quad (2)$$

$e$ can be written as $$e = (Z - Z')$$

then $X'$ expressed in terms of $Z$ and $Z'$ is $$X' = (aK/S—a)\ (Z - Z') \quad (3)$$

Equation (3) implements into the portion of the system shown in FIG. 3 including the amplifier 25, the feedback network comprising C1 and R2 and the inputs comprising R1, and R5, C4 and R6.

For $C1 = C4$, $R2 = R6$ and $R1 = R5$, the expression for the circuit is $$X' = - R2/R1//SC1R2{+}1\ (Z - Z')$$

or $$X' = - (1/C1R2)\ (R2/R1)/S + 1/C1R2\ (Z - Z') \quad (4)$$

By comparing equations (3) and (4)

$$a = - 1/C1R2$$

and $K = R2/R1$ "$a$" in radians, is chosen so that the circuit integrates the difference over the allowed bandwidth of the input signal. For instance, if the input bandwidth begins at 25 KHz, "$a$" should be set to approximately $2\pi$ (20 KHz).

The value of the constant $K$ will be defined later in this discussion.

From equation (3) and considering FIG. 2A, the entire expression for the system can be written as $$X' = aK/S—a\ (Z - Z')$$

where $$Z' = H'X'$$

and $$Z = HX$$

Substituting the description of $Z$ and $Z'$ into equation (3) and solving for $X'$;

$$X' = [aK/S—a(1{+}KH')]\ HX \quad (5)$$

Since the object of the system is to make $X'$ equal to $X$, the value of $K$ should be set very large ($K$ equal to or greater than 10 is usually a sufficient condition). Assuming $K$ to be large, equation (5) becomes $$X' \approx H/H'\ X$$

Therefore the desired object can be achieved by selecting $H'$ to equal $H$ over the bandwidth of the input signal $X$.

To make $H = H'$, the transfer function of the transducer 7 and preamplifier 9 must be defined, then the transfer function $H'$ can be designed.

For example, if the transfer function H is such that the log G increases linearly to a first frequency $b$ (which may be, for example, 20 KHz) and then remains constant to a second frequency C (which may be, for example, 35 KHz), following which it decreases linearly, then $$H = - DS/((S/C) + 1)\ ((S/b) + 1) \quad (6)$$

This equation is implemented into the portion of the circuit shown in FIG. 3 which includes amplifier 27, its input network R3 and C2, and its feedback network C3 and R4. The equation for this circuit is $$Z' = - SC2R4/(SC2R3{+}1)\ (SC3R4{+}1)\ X'$$

where $$H' = - SC2R4/(SC2R3{+}1)\ (SC3R4{+}1) \quad (7)$$

By comparing equations (6) and (7)

$D = C2R4$, $b = 1/C2R3$, and $C = 1/C3R4$

Thus in accordance with the foregoing equations, the design parameters of the circuit shown in FIG. 3 can be calculated.

FIG. 4 of the drawings is a highly schematic illustration of a multigap magnetic ink character recognition system as presently known in the art, showing the manner in which filters in accordance with the present invention would be utilized in such a system.

A document 31 bearing characters printed in magnetizable ink, such as that shown at 33, is passed beneath a plurality of magnetic read heads indicated generally at 35. These heads provide a simultaneous scan on a number of channels or tracks through the characters, and provide a corresponding plurality of electrical signals on output lines such as 39, one for each of the heads. Electrical signals of course will be similar to those shown in FIG. 1B of the drawings.

Because of the relatively low magnitude of the signals, they are passed through a plurality of preamplifiers 41, which provide an amplified output signal at a corresponding plurality of outputs. In each one of the output channels of amplifiers 41, a prediction filter which may be of the type shown in FIG. 3 is provided, these filters being indicated generally by the reference character 43. The output of the filters is supplied to a storage matrix 45 in accordance with the usual operation of systems of this type, and the information in the matrix is decoded by recognition logic 47 and supplied therefrom to a utilization device 49.

As pointed hereinbefore, the prediction filters are designed and arranged so that they compensate for the deficiencies in the magnetic heads and the preamplifier circuitry.

While the invention has been particularly shown and described with reference to a preferred embodiment thereof, it will be understood by those skilled in the art that various changes in form and details may be made therein without departing from the spirit and scope of the invention.

I claim:

1. A character recognition system including a data preprocessing system for compensating for errors in scanning characters to be recognized, comprising in combination, scanning means for scanning characters to be recognized and generating scanning signals in response to said scanning, amplifier means having an input and an output, the input being connected to said scanning means to receive signals therefrom and amplify the signals, recognition circuit means, and feedback compensating means comprising a Kalman filter network connected to the output of said amplifier means and the input of said recognition circuit means, said filter network being selected and arranged to compensate for inherent transfer characteristics in said scanning means and said amplifier means, said filter network including means for feeding back a portion of the signal at the output of said network to the input of said network, said network having a transfer characteristic similar to the combination of said scanning means and said amplifier means.

2. A system as claimed in claim 1, said filter further including an active feedback network having a transfer characteristic similar to the inherent response of said scanning means and said amplifier means, and connecting the output of said filter to the input thereof to provide negative feedback.

3. A predictive filter system for a signal channel of a character recognition system comprising, in combination, a first amplifier having an input terminal connected to said channel to receive input signals therefrom, and an output terminal connected to said channel to deliver output signals thereto, a second amplifier having an input terminal and and output terminal, a first passive impedance network connected between the output terminal of said first amplifier and the input terminal of said second amplifier, and a second passive impedance network connected between the output terminal of said second amplifier and the input terminal of said first amplifier, said amplifiers and said networks having a transfer characteristic similar to that of said channel which removes the distortion effects in said channel.

4. A predictive filter system as claimed in claim 3, in which said first and said second amplifiers are operational amplifiers.

5. A predictive filter system as claimed in claim 4, in which passive impedance feedback networks are provided for each of said amplifiers and connected between the output terminal and an input terminal of the associated operational amplifier.

6. A predictive filter system as claimed in claim 5, in which said feedback networks comprise parallel combinations of resistance and capacitance.

7. A predictive filter system as claimed in claim 3, in which said impedance networks comprise at least a series circuit combination of resistance and capacitance.

8. A predictive filter system as claimed in claim 7, in which said second impedance network includes a series-parallel resistance-capacitance network.

9. A predictive filter for a signal channel in a character recognition system comprising, in combination, a filter input terminal, a filter output terminal, a first operating amplifier having a first terminal of two input terminals connected to the filter input terminal and having its output terminal connected to the filter output terminal, a first passive impedance feedback network connected from the output terminal of said first amplifier to the first input terminal thereof, an active feedback network connected form the output terminal of the first amplifier to the second input terminal thereof, comprising a second operating amplifier having a first terminal of two input terminals connected to the output terminal of the first amplifier via a first series impedance network, circuit means connecting the second input terminal of said second amplifier to a common ground connection, a second passive impedance feedback network connected from the output terminal of said second amplifier to the first input terminal of said second amplifier, and a second series inpedance network coupling the output terminal of the second amplifier to the second input terminal of the first amplifier, said filter having a transfer characteristic similar to the characteristic of said channel for removing distortion effects in said channel.

10. A predictive filter network as claimed in claim 9, in which said impedance feedback networks comprise resistance and capacitance elements connected in parallel combinations.

* * * * *